United States Patent [19]

Hashemi

[11] 4,163,878

[45] Aug. 7, 1979

[54] ELECTRONIC HYBRID AND HYBRID REPEATER WITH BRIDGE CIRCUIT

[75] Inventor: Mike A. Hashemi, Bolingbrook, Ill.

[73] Assignee: Wescom, Inc., Downers Grove, Ill.

[21] Appl. No.: 831,157

[22] Filed: Sep. 7, 1977

[51] Int. Cl.$^2$ ............................................. H04B 1/58
[52] U.S. Cl. ......................... 179/170 NC; 179/170 R
[58] Field of Search ................. 179/81 R, 81 A, 81 B, 179/170 R, 170 D, 170 NC

[56] References Cited

U.S. PATENT DOCUMENTS

| 2,629,024 | 2/1953 | Edwards | 179/170 NC |
|---|---|---|---|
| 2,946,861 | 7/1960 | Chen | 179/170 NC |
| 3,271,528 | 9/1966 | Vallese | 179/170 T |
| 3,479,468 | 11/1969 | Kretzmer | 179/81 A |
| 3,529,099 | 9/1970 | Ribner | 179/81 R |
| 3,973,088 | 8/1976 | Ota et al. | 179/170 NC |
| 3,974,344 | 8/1976 | Mersich | 179/81 A |
| 3,983,323 | 9/1976 | Griffith et al. | 178/58 R |
| 4,081,622 | 3/1978 | Clark et al. | 179/1 HF |
| 4,113,996 | 9/1978 | Sanderson | 179/170 D |

FOREIGN PATENT DOCUMENTS

2132322 1/1972 Fed. Rep. of Germany ... 179/170 NC

Primary Examiner—Kathleen H. Claffy
Assistant Examiner—Randall P. Myers
Attorney, Agent, or Firm—Leydig, Voit, Osann, Mayer & Holt, Ltd.

[57] ABSTRACT

A hybrid bridge circuit has a feed amplifier and an auxiliary resistor connected in series with the output of the receive amplifier between the amplifier and a node of the bridge so that signals from the receive amplifier are transmitted through the two-wire line port in the bridge to the auxiliary resistor and a resistive leg of the bridge, and signals from the two-wire line are transmitted to both the node V1 between the two-wire line port and the adjacent resistive leg of the bridge and the node V2 between the compensating network in the bridge and the adjacent resistive leg of the bridge. A differential transmit amplifier differentially receives inputs from the nodes V1 and V2 so that the differential amplifier produces a partially equalized output signal corresponding to the difference between the voltages at the nodes V1 and V2. The resistance values R1 and R2 of the two resistors legs of the bridge, and the impedances $Z_c$ and $Z_L$ of the compensating network and the two-wire line in the bridge, satisfy the equation $R1/R_L=R2/Z_c$ to maximize the transhybrid loss, and the resistor R2 adjacent the compensating network is substantially larger than the resistor R1 adjacent the two-wire line to minimize the power losses in the compensating network and the resistor R2. This hybrid bridge circuit can be used in repeaters or terminating devices in communication networks.

22 Claims, 4 Drawing Figures

ELECTRONIC HYBRID AND HYBRID REPEATER WITH BRIDGE CIRCUIT

DESCRIPTION OF THE INVENTION

The present invention relates generally to hybrid circuits of the type used in telephone systems and, more particularly, to hybrid circuits suitable for use in telephone repeaters which are provided in telephone transmission lines to compensate for signal degradation.

Hybrid circuits are used in communication networks as terminating devices or as an interface between a bidirectional two-wire line and individual unidirectional sections of a four-wire line. In telephony, for example, bidirectional signals may be carried over a two-wire line in a subscriber loop, but must be split into separate transmit and receive unidirectional signals at the central office. Various forms of hybrid circuits have been developed to accomplish these functions.

The most commonly used hybrid circuit is a magnetic element known as a hybrid transformer, and comprises a multiwinding transformer having a two-wire port, separate transmit and receive ports, and a balance network port. The windings are arranged so that signals imposed on the two-wire port are coupled to the transmit port, and signals imposed on the receive port are coupled to the two-wire port but not to the transmit port. Hybrid transformers have been in use for many years, but suffer from the disadvantages of comparatively large size, high cost, and a limitation on packaging density.

Other types of hybrid circuits that have been proposed and/or used include various bridge circuits and various "active" circuits utilizing operational amplifiers.

One common use of hybrid circuits is in "repeaters", which are devices interposed at spaced intervals along a telephone line to compensate for signal attenuation in the line by boosting or amplifying the signal. A typical repeater comprises a loop formed by two hybrid circuits with the receive port of each hybrid circuit connected to the transmit port of the other hybrid circuit, and with the two-wire ports of the two hybrids forming the input and output terminals of the loop for connection to the transmission line. One of the requirements for repeaters used with nonloaded lines is that they "equalize" the signal being amplified. Because of the characteristics of the complex impedance of a transmission line, the signals transmitted through a nonloaded line are attenuated differently at different frequencies; typically, the high frequency components of the signal are attenuated more than the low frequency components. Consequently, when the signal from a nonloaded line is amplified in a repeater, it is desirable to amplify the high frequency components more than the low frequency components to compensate for the uneven attenuation of the different components of the signal in the line, thereby "equalizing" the signal.

When equlization is required in a repeater, the amount of gain that can be achieved in the repeater for the total signal is reduced. First of all, regenerative feedback within the repeater loop must be avoided because such feedback introduces instability in the form of "singing". To avoid regenerative feedback, the total gain of the repeater cannot exceed the losses therein. Thus, since the high frequency components of the signal must be amplified more than the low frequency components to achieve equilization, the total gain that can be achieved in repeaters for nonloaded lines is limited to the maximum gain that can be tolerated for the high frequency components without causing regenerative feedback. Unfortunately, it is the high frequency components of the signal—those that must be amplified the most—that are primarily responsible for the singing and other deleterious results of regenerative feedback. So the need for equilization in a repeater severely restricts the total signal gain that can be attained.

It is a primary object of this invention to provide an improved hybrid circuit that permits increased gain within a repeater for nonloaded lines while achieving equalization across the entire frequency band of the signal. In this connection, a related object of the invention is to provide such an improved hybrid circuit that reduces the amount of equalization required within the repeater loop itself.

It is another object of the invention to provide such an improved hybrid circuit that provides partial equalization within the hybrid circuit itself.

It is still another object of this invention to provide an improved hybrid circuit of the foregoing type that is suitable for use in a variety of general purpose applications, including terminating devices and two-wire/two-wire or two-wire/four-wire repeaters.

A further object of this invention is to provide such an improved hybrid circuit that can be economically produced at a relatively low cost compared with other commercially available hybrid circuits.

A still further object of the invention is to provide such an improved hybrid circuit that has relatively low power losses so that a large number of the hybrid circuits can be densely packaged in a small space without heat dissipation problems.

Yet another object of the invention is to provide such an improved hybrid circuit which is transformer-isolated to avoid problems of longitudinal balance so that it can be used on both balanced and unbalanced lines.

Other objects and advantages of the invention will be apparent from the following detailed description and the accompanying drawings, in which.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined in the appended claims.

Figure 1:
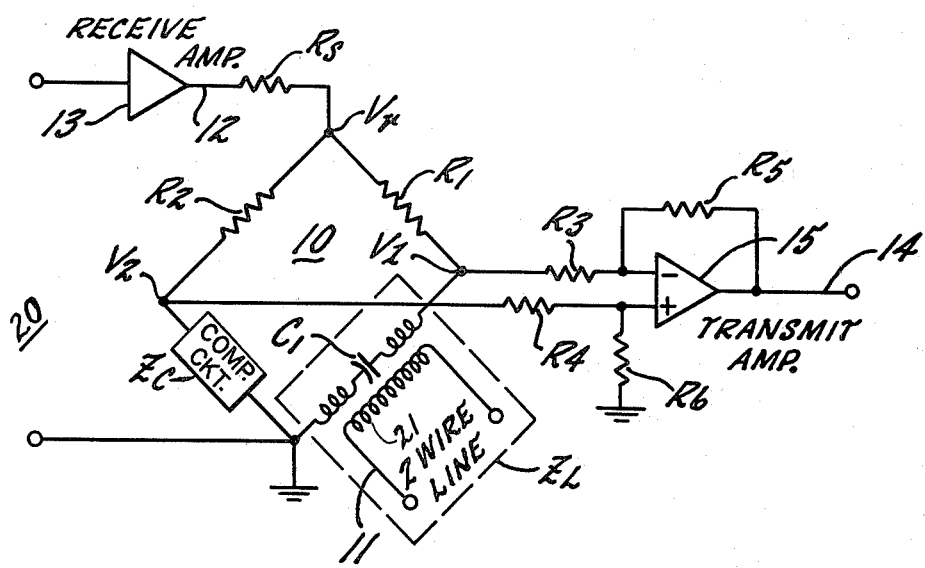
FIG. 1 is a simplified circuit diagram of a hybrid circuit embodying the invention.

Turning now to the drawings and referring first to FIG. 1, there is shown a hybrid bridge circuit 10 for interfacing a two-wire line 11 with a four-wire line comprising a receive line 12 for supplying signals to the two-wire line 11 via an amplifier 13, and a transmit line 14 for receiving signals from the two-wire line 11 via an amplifier 15. The basic purpose of the hybrid circuit is to provide a matched impedance (1) to the bidirectional two-wire line 11 from the unidirectional receive line 12 and (2) to the unidirectional transmit line 14, from the two-wire line, while at the same time providing a high degree of isolation of (1) the transmit line 14 from the receive line 12 and (2) the receive line 12 from the two-wire line 12. The isolation of the transmit line from the receive line is commonly referred to as "transhybrid loss", with an infinite transhybrid loss representing the ideal 100% signal isolation. Good impedance matching and signal isolation avoid undesirable signal "reflections" and other objectionable interference or degradation of the quality of the signals transmitted through the hybrid circuit.

In the case of the illustrative hybrid circuit 10, isolation of the transmit amplifier 15 from signals arriving at the receive port 20 is achieved by providing a balanced bridge with a repeating coil 21 (forming a two-wire port) and a compensating network $Z_c$ in adjacent legs of the bridge. The compensating network $Z_c$ is designed to present a frequency-dependent impedance to signals from the receive port 20 which approximates the impedance characteristic $Z_L$ of the line 11 presented to the two-wire port, so that the bridge 10 can be balanced. The node between $Z_L$ and $Z_c$ is grounded, and the other two legs of the bridge contain balancing resistors R1 and R2, with signals arriving at the receive port 20 from the receive amplifier 13 being transmitted to the two-wire line 11 via node Vr and the resistor R1.

The use of compensating networks, often referred to as "precision balance networks" or "PBN's", is well known in hybrid circuits, including hybrid bridges. The nature of the specific network used in any given application depends on the characteristics of the two-wire line involved, such as the gauge of the line and the load thereon. Since these networks are so well known in the art, no specific examples will be illustrated or described herein.

To balance the bridge, the values of the parameters are selected to satisfy the equation $R1/Z_L = R2/Z_c$ so that the differential signal across the nodes V1 and V2 which form the transmit port is unaffected by the transmission of signals from the receive amplifier 13 to the two-wire line 11. That is, the bridge is balanced for signals supplied to the receive port 20, and thus the voltages V1 and V2 always change by the same increment in response to signal transmission from the receive amplifier 13 to the two-wire line 11. This effectively isolates the input to the transmit amplifier 15 from signals entering the bridge from the receive amplifier, providing a high transhybrid loss in this mode of operation.

When signals are transmitted from the two-wire line 11 to the transmit amplifier 15, the magnitude of the voltage changes at V1 are different from those at V2 because the bridge is not balanced for signals received at the two-wire port. However, good signal isolation is still maintained in this mode of operation because there is an a-c. ground provided by the output of the receive amplifier 13, thereby effectively isolating the receive amplifier 13 from signals transmitted from the two-wire line 11 to the transmit amplifier 15.

In accordance with one important aspect of the present invention, the resistor R2 in the bridge leg adjacent the leg containing the compensating network $Z_c$ is substantially larger than the resistor R1 in the bridge leg adjacent the leg containing the two-wire line 11 to minimize the power losses in the compensating network $Z_c$ and the adjacent resistor R2 when signals are transmitted from the receive amplifier 13 to the two-wire line 11. This ensures that most of the available power of the receive amplifier 13 is utilized in driving the two-wire line 11 rather than being wasted and dissipated as heat in R2 and $Z_c$ which simply lead to ground. Furthermore, the capacitors in the compensating network $Z_c$ can be made much smaller than would be permissible if the resistors R1 and R2 were equal, for example. This reduction in the size of the capacitors represents a significant cost reduction and permits the hybrid circuit to be economically manufactured.

In accordance with another important aspect of the invention, an auxiliary resistor is connected in series with the output of the receive amplifier between the amplifier and the bridge so that signals from the receive amplifier are transmitted to the two-wire line through the auxiliary resistor as well as one of the resistors in the bridge, and signals from the two-wire line are transmitted to the transmit line via both (1) the node V1 between the two-wire line and the adjacent resistor R1 and (2) the node V2 between the compensating network $Z_c$ and the adjacent resistor R2. From the transmit port formed by the two nodes V1 and V2, the signals from the two-wire line are differentially applied via resistors R3 and R4 to the inputs of a differential transmit amplifier so that the transmit amplifier produces a partially equalized output signal corresponding to the difference between the voltages produced at the nodes V1 and V2. Thus, in the illustrative circuit of FIG. 1 an auxiliary series resistor Rs is connected between the output of the receive amplifier 13 and the node Vr between the resistors R1 and R2. Because of the presence of the resistor Rs, incoming signals from the two-wire line 11 appear at both the nodes V1 and V2, rather than only node V1. Without the resistor Rs, incoming signals from the two-wire line 11 would not appear at the node V2 because the node Vr between R1 and R2 would be an a-c. ground by virtue of its direct connection to the output of the receive amplifier 13. However, by providing the resistor Rs in series with the node Vr and the output of the receive amplifier 13, outside the bridge 10, a voltage drop is interposed between the node Vr and the a-c. ground at the output of amplifier 13, and thus a portion of the signal from the two-wire line passes through R2 and $Z_c$ to the grounded node between $Z_c$ and $Z_L$.

In the case of a nonloaded line, the signals that appear at both the nodes V1 and V2 require equalization because of the uneven attenuation at different frequencies. However, because the transmit amplifier 15 senses only the differential signal across the nodes V1 and V2, the output of the amplifier 15 is partially equalized. Consequently, when the hybrid circuit is utilized in a repeater, less equalization is required in the repeater loop, which permits a higher gain to be attained in the loop because the gain for the lower frequency components of the signal can more closely approach the gain for the higher frequency components. This equalization feature of the hybrid circuit is also advantageous when the hybrid is used to couple a two-wire line and a four-wire line, i.e., where gain is not involved.

Figure 3:
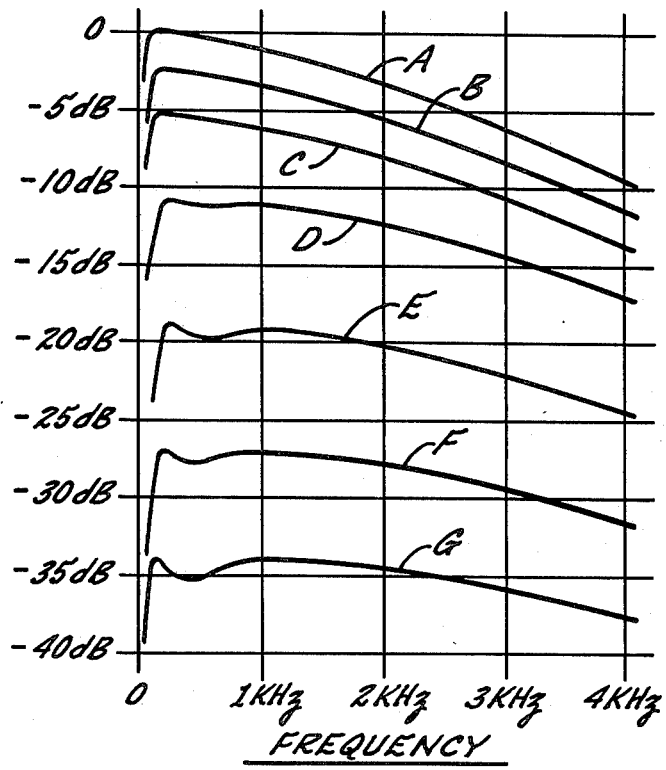
FIG. 3 is a graphical illustration of signal attenuation vs. frequency in the circuit of FIG. 1 at different values of R1, R2 and Rs and with a nonloaded two-wire line.
Figure 2:
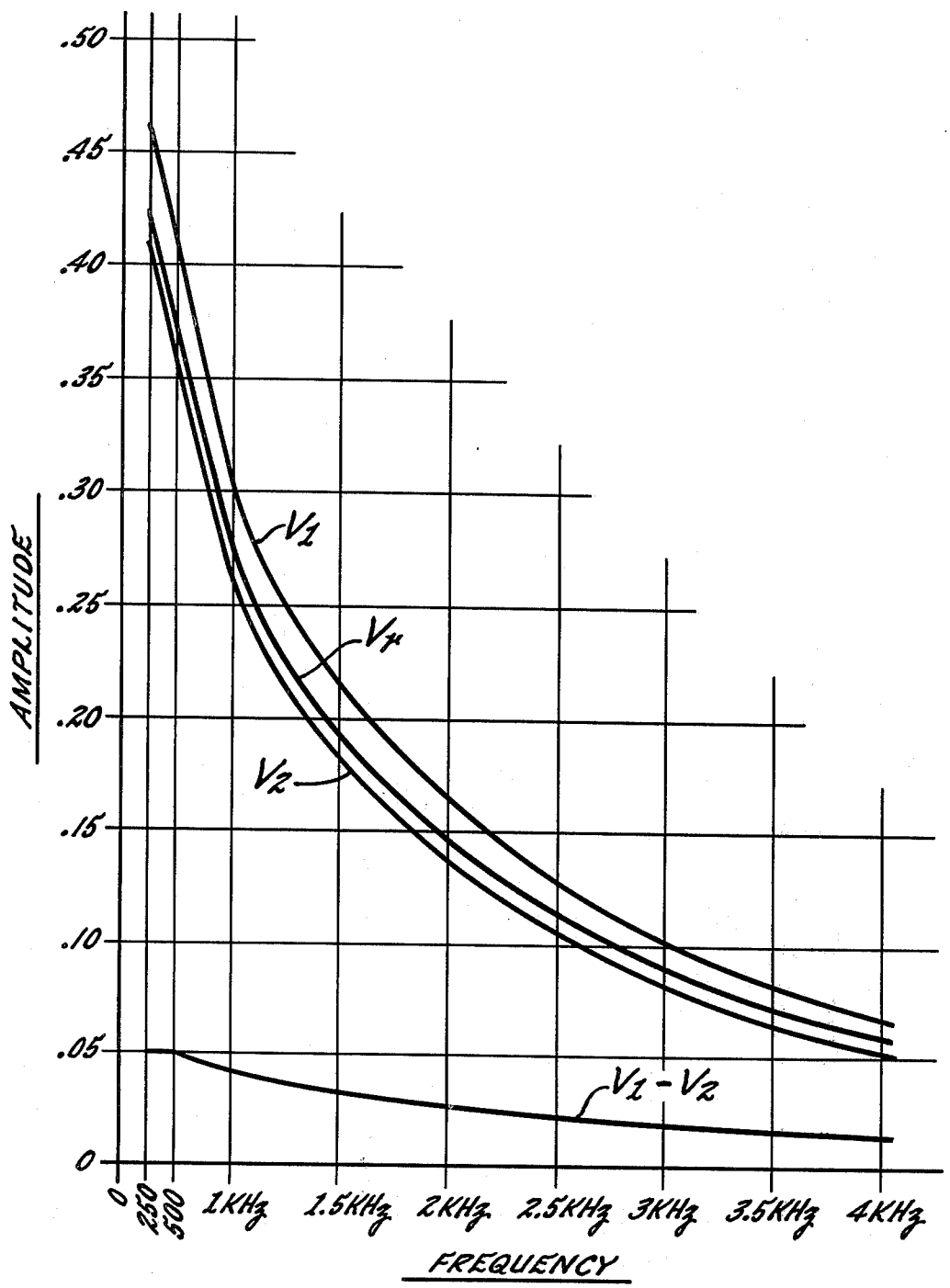
FIG. 2 is a graphical illustration of signal level vs. frequency at three different nodes V1, Vr, and V2, as well as the difference between the signal levels at V1 and V2, when used with a nonloaded line.

The advantageous effect of the resistor Rs on signals transmitted from the two-wire line to the transmit amplifier 15 can be more clearly understood from the curves shown in FIGS. 2 and 3. FIG. 2 illustrates the voltage levels at the nodes V1, Vr, and V2, and the differential (V1-V2), as a function of frequency, in the circuit of FIG. 1 with a nonloaded line. Without Rs, the voltages at the nodes Vr and V2 would both be zero because of the connection of the node Vr directly to the a-c. ground provided at the output of the receive amplifier 13; in this case, the voltage V1 would be somewhat higher than illustrated in FIG. 2, but the general shape of the voltage vs. frequency curve would still be the same. Thus, it can be seen that with a nonloaded line the input signal to the transmit amplifier, i.e., the signal at the node V1, would be increasingly attenuated with increasing frequency.

With Rs in the circuit, however, a signal from the two-wire line appears at all three nodes V1, Vr and V2, with the voltage levels at each succeeding node decreasing due to the successive voltage drops across the resistors R1 and R2. As in the case of the signal level at node V1, the signal levels at the nodes Vr and V2 exhibit increasing attenuation with increasing frequency in the case of a nonloaded line, as illustrated by the curves Vr and V2 in FIG. 2. However, as can be clearly seen in FIG. 2, the differential signal (V1-V2) exhibits substantially less attenuation than the signals at either V1 or V2, and thus this differential signal is partially equalized. For example, the signal level at V1 drops from 0.460 at 250 Hz to 0.068 at 4000 Hz, and V2 drops from 0.410 at 250 Hz to 0.053 at 4000 Hz. Both these drops are substantially greater than the drop in the differential signal (V1-V2), which decreases from 0.050 at 250 Hz to 0.015 at 4000 Hz.

FIG. 3 illustrates signal attenuation as a function of frequency across the circuit of FIG. 1 with unloaded line (24 gauge, 24000 feet) and the following values of R1, R2 and Rs:

|  | R1 | R2 | Rs |
|---|---|---|---|
| Curve A | 900 ohms | 20,000 ohms | 0 ohms |
| Curve B | 500 | 11,111 | 400 |
| Curve C | 300 | 6,666 | 600 |
| Curve D | 200 | 3,333 | 700 |
| Curve E | 50 | 1,111 | 850 |
| Curve F | 20 | 444 | 880 |
| Curve G | 10 | 222 | 890 |

As can be seen from FIG. 3, the slope of the attenuation curve diminishes considerably at increasing values of Rs. With Rs=0, the attenuation curve drops from −1 db at 1000 Hz to −9 db at 4000 Hz (curve A). With Rs=800 ohms. the curve drops only from −34 db at 1000 Hz to −37 db at 4000 Hz, thereby providing an input signal to the transmit amplifier 15 that is partially equalized. Although the magnitude of the input signal to the transmit amplifier is reduced as the value of Rs increases, this reduction in amplitude does not present a gain problem because the attendant increase in the transhybrid loss permits additional gain to be built into the transmit amplifier 15 or one or more additional amplifiers in series therewith. The net result is that the partial equalization of the output signal from the transmit amplifier 15 permits the total gain of a repeater utilizing this hybrid circuit to be increased significantly. For example, whereas a typical two-wire/two-wire repeater achieves up to 11 db of gain in each direction, a repeater utilizing the hybrid circuit of the present invention can achieve gain increases of 2 to 2 db in each direction, which represents an increase in the range of 18 to 27%.

The termination impedance presented by the illustrative circuit to signals arriving from the two-wire line 11 is the series combination of resistors Rs and R1 plus a capacitor C1 between the secondary windings of the repeating coil 21. As explained previously, this termination impedance should substantially match that of the two-wire line 11, which is generally presumed to comprise a resistance either 600 ohms or 900 ohms plus a capacitance of 2.15 mf in most standard telephone systems. As between Rs and R1, it is preferred to have Rs form by far the major portion of the termination impedance in order to minimize the value of R1 and thereby minimize the impedance and power loss in the bridge. As R1 is reduced, R2 must be reduced and/or $Z_c$ must be increased in order to satisfy the equation $R1/Z_L = R2/Z_c$ because $Z_L$ is fixed. It is desirable to keep $Z_c + R_2$ relatively small to avoid noise problems at V2, and thus it is preferred that R2 be reduced as R1 is reduced. However, it is desired to keep R2 large in order to minimize power losses in that side of the bridge. Furthermore, as R1 and R2 are reduced, the magnitude of the differential in the signal levels at V1 and V2 diminishes (see FIG. 3), thereby reducing the signal-to-noise ratio in the differential signal sensed by the amplifier 15. Consequently, there is a practical limit to how far R1 can be reduced, and a compromise must be struck in dividing the resistance portion of the termination impedance between R1 and Rs. A suitable compromise is an R1 value that comprises about 10% of the required resistance, with Rs comprising the other 90%.

Figure 4:
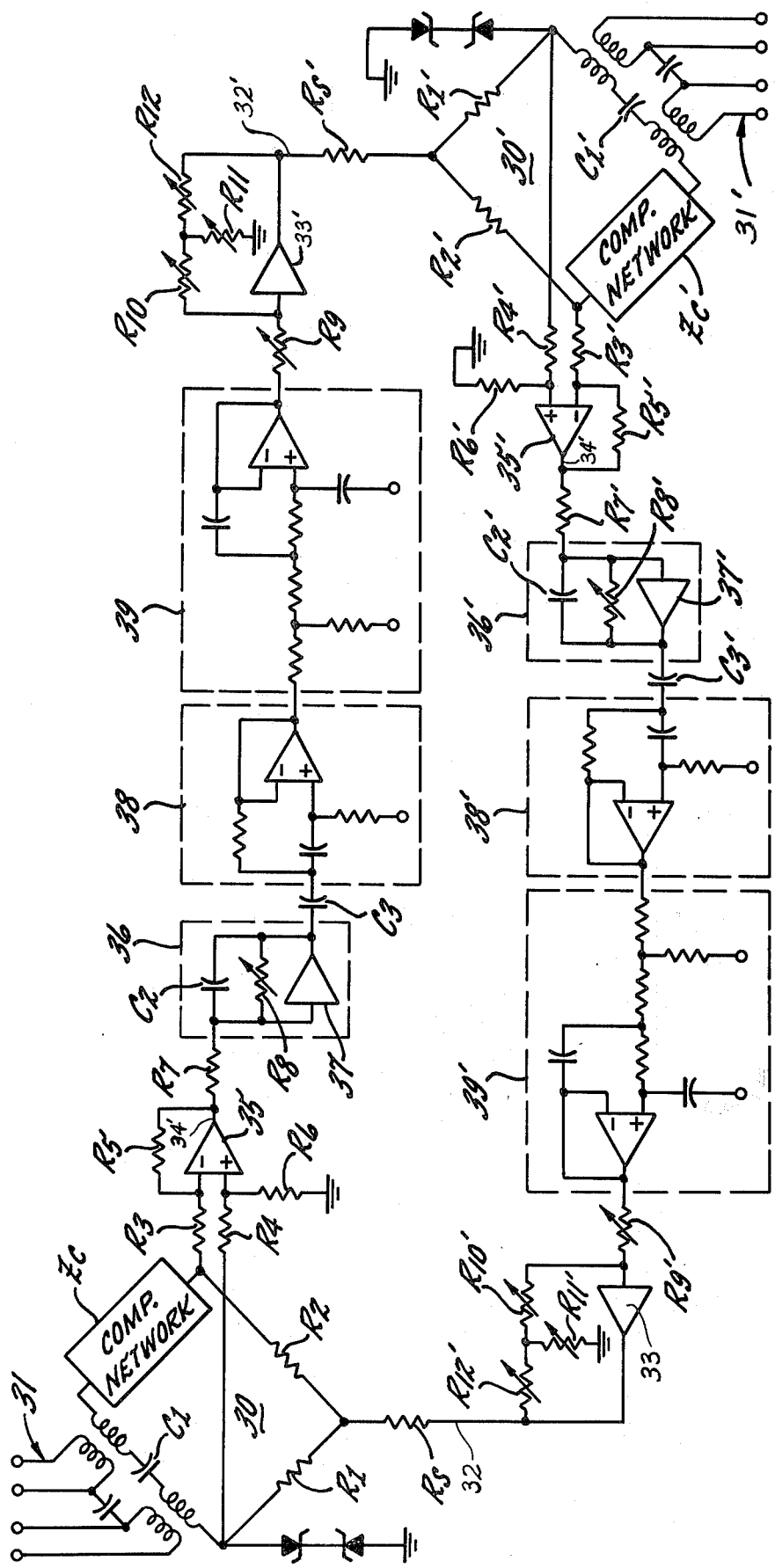
FIG. 4 is a circuit diagram of a two-wire/two-wire repeater utilizing hybrid circuits embodying the invention.

In FIG. 4 there is illustrated an exemplary two-wire/two-wire repeater for use with a nonloaded line. The repeater comprises two hybrid circuits of the type shown in FIG. 1, connected back-to-back to form a closed loop, i.e., the transmit port of each hybrid circuit is connected to the receive port of the other hybrid circuit. Thus, referring specifically to FIG. 4, a bridge 30 couples a two-wire line 31 with (1) a receive line 32 for supplying signals from the repeater to the two-wire line via a receive amplifier 33 and (2) a transmit line 34 for receiving signals from the two-wire line 31 via a differential amplifier 35. The bridge circuit is identical to that described above in connection with FIG. 1, including a repeating coil 21, a compensating network $Z_c$ and balancing resistors R1 and R2, with an auxiliary resistor Rs connected in series with the output of the receive amplifier 33 and the node of the bridge between resistors R1 and R2.

The gain of the differential transmit amplifier is set by resistors R5 and R6, and the output of this amplifier is supplied via resistor R7 to a frequency equalization network 36. The network 36 comprises an operational amplifier 37 having a capacitor C2 and a resistor R8 connected in parallel in the feedback loop of the amplifier to provide the requisite equalization of signals received from the two-wire line 31 before they reach the mating two-wire line 31' at the opposite end of the repeater. Frequency equalization networks of this type are well known in the telephony art and need not be described in detail herein.

From the equalization network 36, the equalized signal is passed through a coupling capacitor C3 to a high pass filter 38 and a low pass filter 39 which pass only that portion of the signal within a preselected frequency range. This frequency range may vary somewhat for different applications, but in general repeaters designed for use in telephone transmission lines pass signals within a frequency range from about 250 Hz to about 3500 or 4000 Hz. This frequency range generally encompasses all signals of interest, and thus any signals outside this frequency range are preferably rejected to avoid interference with the desired signals. The particular cicuitry employed in the high pass and low pass filters 38 and 39 is well known to those familiar with the telephone art and need not be described in detail herein. As can be seen from the circuit diagram in FIG. 4, the illustrative filters 38 and 39 each include an operational amplifier in association with various passive components.

From the low pass filter 39, the signals are fed through a resistor R9 to a receive amplifier 33' associated with a second hybrid bridge circuit 30'. A tee of three resistors R10, R11 and R12 in the feedback loop of the amplifier 33' is set to control the gain of the amplifier, and an auxiliary resistor Rs' is connected in series with the output of the amplifier 33' and the node between resistors R1' and R2' in the bridge 30'. As in the case of the first hybrid bridge circuit 30, the second hybrid bridge circuit 30' is identical to the bridge circuit 10 described above in connection with FIG. 1.

The nodes V1' and V2' of the bridge 30' are differentially applied to the transmit amplifier 35' which produces a partially equalized output signal that is fed through a frequency equalization network 36', a high pass filter 38', and a low pass filter 39' to the receive amplifier 33 of the first bridge circuit 30. It can be seen that the signal path from the transmit amplifier 35' of the bridge circuit 30' to the receive amplifier 33 of the bridge circuit 30 is identical to the signal transmission path already described above leading from the transmit amplifier 35 of the bridge circuit 30 to the receive amplifier 33' of the bridge circuit 30'. Thus, it can be seen that the two hybrid bridge circuits 30 and 30' together with the two frequency equalization networks and filters form a closed repeater loop, with the two-wire line ports of the two bridge circuits forming the terminals of the repeater.

It will be understood that the various resistance networks in the repeater shown in FIG. 3 can represent one of a plurality of pads which can be selected by appropriate switch settings, thereby providing a "full prescription" repeater.

As can be seen from the foregoing detailed description, the improved hybrid circuit provided by this invention permits increased gain within a repeater for nonloaded lines while achieving equalization across the entire frequency band of the signal. This result is achieved by providing partial equalization within the hybrid circuit itself, thereby reducing the amount of equalization required within the repeater loop. This hybrid circuit is suitable for use in a variety of different purpose applications, including terminating devices and two-wire/two-wire or two-wire/four-wire repeaters. The circuit has relatively low power losses so that a large number of the circuits can be densely packaged in a small space within heat dissipation problems, and the circuit is transformer-isolated to avoid problems of longitudinal balance so that it can be used on both balanced and unbalanced lines. Furthermore, the hybrid circuit can be economically produced at a relatively low cost compared with other commercially available hybrid circuits.

I claim as my invention:

1. A hybrid bridge circuit comprising:
   a two-wire port circuit and a compensating network in one pair of adjacent legs of the bridge on opposite sides of an a-c. ground, said compensating network having a frequency dependent impedance which approximates the impedance characteristic presented by the two-wire line to the bridge,
   balancing resistors R1 and R2 in the other pair of adjacent legs,
   a receive amplifier and an auxiliary resistor Rs connected in series with the output of the receive amplifier between the amplifier and the node between the resistors R1 and R2 for presenting an impedance to both positive-going and negative-going signals from the two-wire line so that all signals from the two-wire line are transmitted to both the node V1 between said two-wire line and the adjacent resistor R1 and the node V2 between said compensating network and the adjacent resistor R2, with signals from the receive amplifier being transmitted to the two-wire line through said auxiliary resistor Rs and the resistor R1 in the bridge, and
   a differential transmit amplifier differentially receiving inputs from said nodes V1 and V2 so that the differential amplifier produces a partially equalized output signal corresponding to the differences between the voltages at said nodes V1 and V2.

2. A hybrid bridge circuit as set forth in claim 1 wherein said compensating network and said two-wire line have impedances $Z_c$ and $Z_L$, respectively, with the values of R1, R2, $Z_c$ and $Z_L$ satisfying the equation $R1/Z_L = R2/Z_c$ to maximize the transhybrid loss, and the resistor R2 adjacent said compensating network is substantially larger than the resistor R1 adjacent the two-wire line to minimize the power losses in said compensating network and said resistor R2.

3. A hybrid bridge circuit as set forth in claim 1 wherein the leg of the bridge forming the two-wire port circuit includes a capacitor, and wherein the termination impedance formed by the combination of said capacitor, the resistor R1 adjacent said two-wire line and said auxiliary resistor Rs is about the same as the impedance of the two-wire line, and the major portion of the resistance portion of said termination impedance is provided by said auxiliary resistor Rs.

4. A hybrid bridge circuit as set forth in claim 3 wherein said termination impedance comprises a resistance of about 600 or 900 ohms and a capacitance of about 2.5 microfarads.

5. A hybrid bridge circuit as set forth in claim 1 wherein said compensating network has a frequency-dependent impedance which approximates the impedance characteristic presented by the two-wire line to the bridge.

6. A hybrid repeater comprising a pair of hybrid bridge circuits as set forth in claim 1 with the output of the transmit amplifier of each bridge circuit connected to the input of the receive amplifier of the other bridge circuit to form a closed repeater loop.

7. A hybrid repeater as set forth in claim 6 which includes equalizing means for completing the equalization of the output signals from the transmit amplifier of each bridge circuit.

8. A hybrid repeater as set forth in claim 6 which includes amplifying means for boosting the amplitude of the output signals from the transmit amplifier of each bridge circuit.

9. A hybrid repeater as set forth in claim 6 wherein said compensating network and said two-wire line in each bridge circuit have impedances $Z_c$ and $Z_L$, respectively, with the values of R1, R2, $Z_c$ and $Z_L$ satisfying the equation $R1/Z_L=R2/Z_c$ to maximize the transhybrid loss, and the resistor R2 adjacent said compensating network in each bridge circuit is substantially larger than the resistor R1 adjacent the two-wire line to minimize the power losses in said compensating network and said resistor R2.

10. A hybrid repeater as set forth in claim 6 wherein the leg of the bridge forming the two-wire port circuit includes a capacitor, and wherein the termination impedance formed by the combination of said capacitor the resistor R1 adjacent said two-wire line and said auxiliary resistor Rs in each bridge circuit is about the same as the impedance of the two-wire line, and the major portion of the resistance portion of said termination impedance is provided by said auxiliary resistor Rs.

11. A hybrid repeater as set forth in claim 6 wherein said compensating network in each bridge circuit has a frequency-dependent impedance which approximates the impedance characteristic presented by the two-wire line to the bridge.

12. A hybrid bridge circuit comprising:
   a transformer-coupled two-wire line with an impedance $Z_L$ and a compensating network with an impedance $Z_c$ in one pair of adjacent legs of the bridge on opposite sides of an a-c. ground,
   balancing resistors R1 and R2 in the other pair of adjacent legs, and
   a four-wire line including a transmit amplifier connected to the nodes between R1 and $Z_L$ and between R2 and $Z_c$, and a receive amplifier connected to the node between the resistors R1 and R2 so that signals from the receive amplifier are transmitted to the two-wire line through the resistor R1 adjacent said two-wire line,
   the resistor R2 adjacent said compensating network being substantially larger than the resistor R1 to minimize the power losses in said compensating network and said resistor R2,
   and the values of R1, R2, $Z_L$ and $Z_c$ satisfying the equation $R1/Z_L=R2/Z_c$ to maximize the transhybrid loss.

13. A hybrid bridge circuit as set forth in claim 12 which includes an auxiliary resistor Rs connected in series with the output of the receive amplifier between the amplifier and the node between the resistors R1 and R2 so that signals from the receive amplifier are transmitted to the two-wire line through said auxiliary resistor Rs and the resistor R1 in the bridge, and signals from the two-wire line are transmitted to both and node V1 between the two-wire line and the adjacent resistor R1 and the node V2 between said compensating network and the adjacent resistor Rs, and said transmit amplifier is a differential transmit amplifier differentially receiving inputs from said nodes V1 and V2 so that the differential amplifier produces a partially equalized output signal corresponding to the difference between the voltages at said nodes V1 and V2.

14. A hybrid bridge circuit as set forth in claim 13 wherein the leg of the bridge forming the two-wire port circuit includes a capacitor, and wherein the termination impedance formed by the combination of said resistor R1 adjacent said two-wire line and said auxiliary resistor Rs is about the same as the impedance of the two-wire line, and the major portion of the resistance portion of said termination impedance is provided by said auxiliary resistor Rs.

15. A hybrid bridge circuit as set forth in claim 14 wherein said termination impedance comprises a resistance of about 600 or 900 ohms and a capacitance of about 2.5 microfarads.

16. A hybrid bridge circuit as set forth in claim 12 wherein said compensating network has a frequency-dependent impedance which approximates the impedance characteristic presented by the two-wire line to the bridge.

17. A hybrid repeater comprising a pair of hybrid bridge circuits as set forth in claim 12 with the output of the transmit amplifier of each bridge circuit connected to the input of the receive amplifier of the other bridge circuit to form a closed repeater loop.

18. A hybrid repeater as set forth in claim 17 which includes equalizing means for completing the equalization of the output signals from the transmit amplifier of each bridge circuit.

19. A hybrid repeater as set forth in claim 17 which includes amplifying means for boosting the amplitude of the output signals from the transmit amplifier of each bridge circuit.

20. A hybrid repeater as set forth in claim 17 in which each bridge circuit includes an auxiliary resistor Rs connected in series with the output of the receive amplifier between the amplifier and the node between the resistors R1 and R2 so that signals from the receive amplifier are transmitted to the two-wire line through said auxiliary resistor Rs and the resistor R1 in the bridge, and signals from the two-wire line are transmitted to both the node V1 between the two-wire line and the adjacent resistor R1 and the node V2 between said compensating network and the adjacent resistor R2, and said transmit amplifier is a differential transmit amplifier differentially receiving inputs from said nodes V1 and V2 so that the differential amplifier produces a partially equalized output signal corresponding to the difference between the voltages at said nodes V1 and V2.

21. A hybrid repeater as set forth in claim 20 wherein the leg of the bridge forming the two-wire port circuit includes a capacitor, and wherein the termination impedance formed by the combination of said capacitor, the resistor R1 adjacent said two-wire line and said auxiliary resistor Rs is about the same as the impedance of the two-wire line, and the major portion of the resistance portion of said termination impedance is provided by said auxiliary resistor Rs.

22. A hybrid repeater as set forth in claim 17 wherein said compensating network in each bridge circuit has a frequency-dependent impedance which approximates the impedance characteristic presented by the two-wire line to the bridge.

* * * * *